Feb. 21, 1950 B. W. BARLOW 2,497,970
INTERNAL-COMBUSTION ENGINE POWER PLANT
Filed Feb. 20, 1948 4 Sheets-Sheet 1
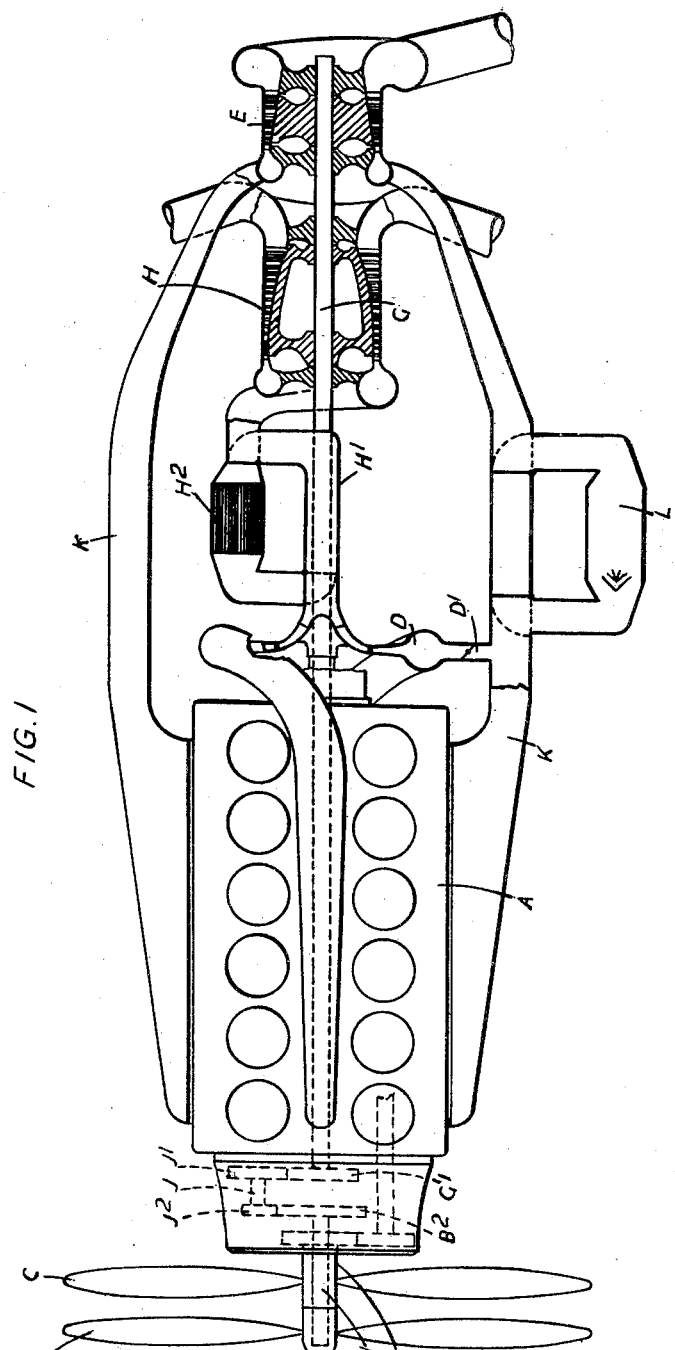
Inventor
Benjamin W. Barlow
By
Emery, Holcombe & Blair
Attorney

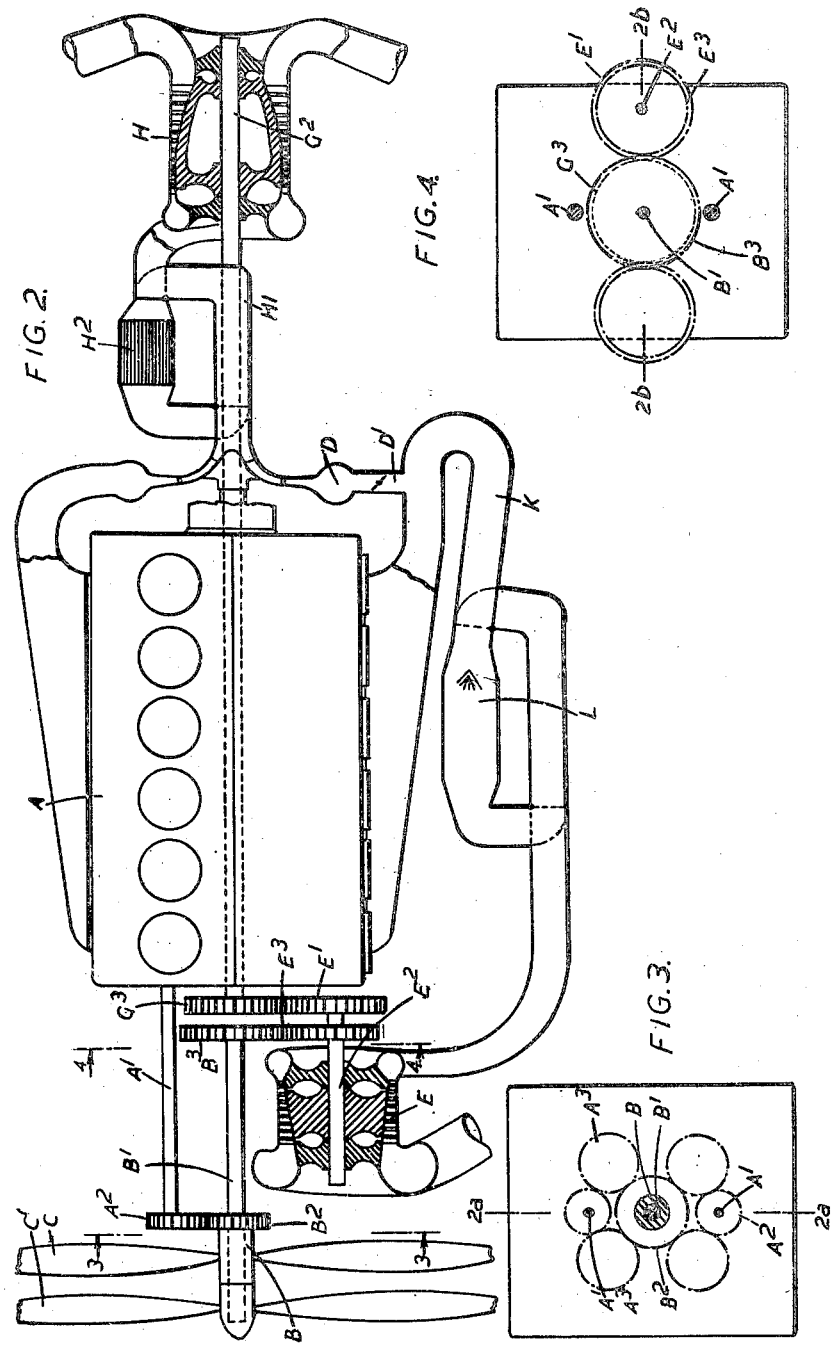

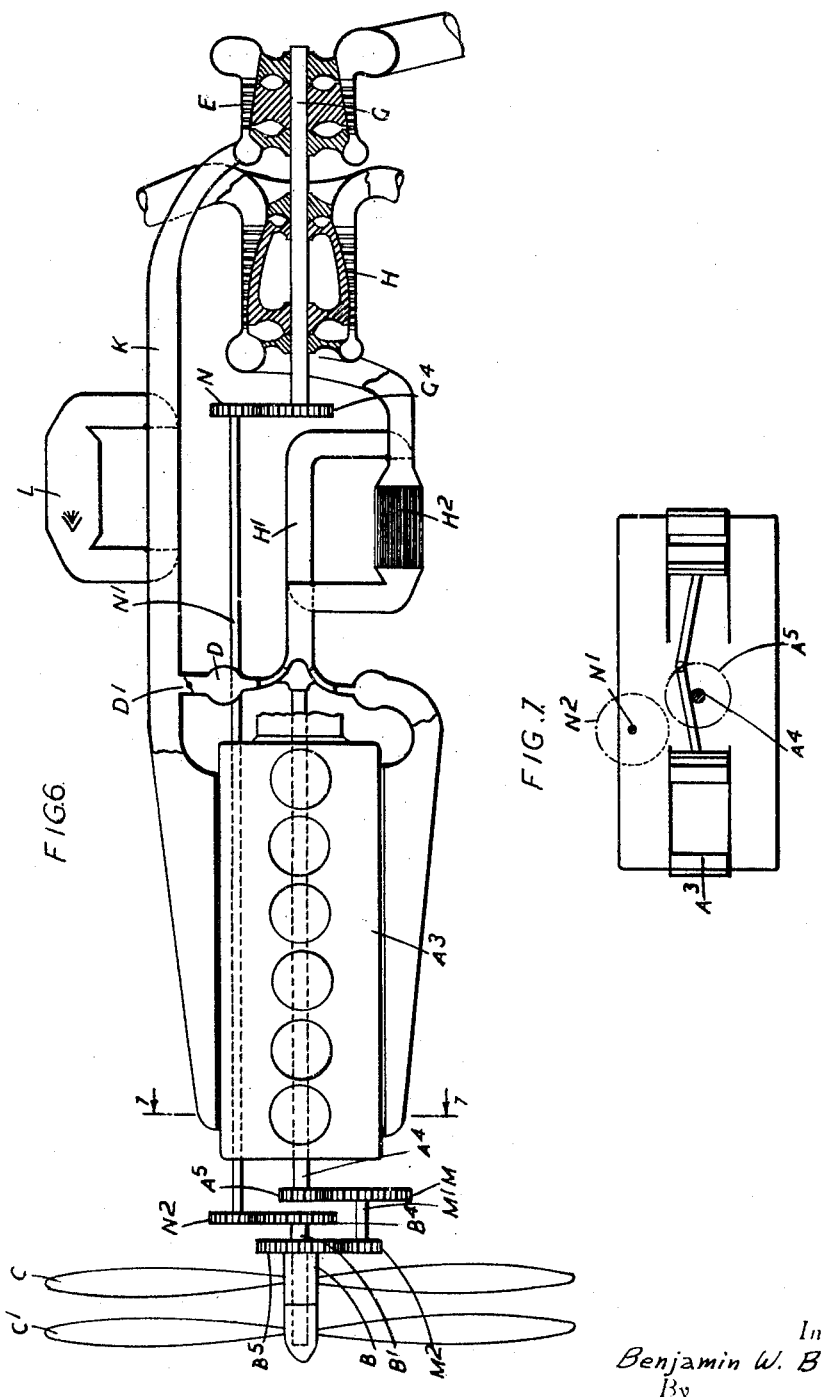

Patented Feb. 21, 1950

2,497,970

UNITED STATES PATENT OFFICE 2,497,970

INTERNAL-COMBUSTION ENGINE POWER PLANT

Benjamin William Barlow, Wembley, England, assignor to D. Napier & Son Limited, London, England, a company of Great Britain Original application September 24, 1946, Serial No. 698,902. Divided and this application February 20, 1948, Serial No. 9,738. In Great Britain November 23, 1944

Section 1, Public Law 690, August 8, 1946
Patent expires November 23, 1964

3 Claims. (Cl. 170—135.28)

This invention relates to an internal combustion engine power plant of the type in which an internal combustion engine operating on the two-stroke cycle and arranged to utilize air in the charge considerably in excess of that required for combustion drives a propeller and also a compressor which supplies supercharging air to the engine while the exhaust gases from the engine pass to and drive a turbine which in turn drives a compressor which delivers air to the engine-driven compressor. It has been suggested in a plant having an engine which operates on the four-stroke cycle that in addition to driving a compressor the turbine should drive a second propeller. In such a plant, however, the amount of gas which the engine can pass is insufficient to drive a full sized propeller in addition to the compressor, and the second propeller was therefore made considerably smaller than the engine driven propeller, the latter producing most of the total thrust of the plant.

With an engine which operates on the two-stroke cycle, however, the air flow through it is considerably greater than in a four-stroke cycle engine, particularly a spark ignition engine in which the amount of air consumed is further limited by the necessity for having a favorable mixture strength. The increased quantity of air flowing through the engine has several advantages. In the first place the cooling of the engine is improved. Another advantage is that the mass of the gases flowing to the turbine is increased enabling the turbine to produce sufficient power to drive a full sized propeller in addition to the compressor. This increase in power output is obtained without having to mix fresh air with the gases and so reduce their temperature. Moreover, the excess air enables additional fuel to be burnt in the gases passing from the engine to the turbine to increase their temperature further and hence to boost the output of the turbine when necessary.

This application is a division of application Serial No. 698,902, filed September 24, 1946, by applicant jointly with Alfred John Penn and Herbert Sammons.

According to this invention the turbine driven by the exhaust gases from the engine drives both an axial flow compressor and also a second propeller, the two propellers being coaxial and oppositely rotated with concentric shafts through which they are driven respectively from the engine and from the turbine. In one arrangement the power is transmitted from the turbine to the compressor and through the latter and gearing and one of the concentric shafts to the propeller. In another arrangement power is transmitted from the turbine through gearing to the compressor and separately through other gearing and one of the concentric shafts to the propeller. Again the power transmission from the turbine to the compressor is by a shaft passing through the engine. In another case the power is transmitted from the turbine through gearing and a shaft parallel to the engine crankshaft or crankshafts to the compressor and through other gearing to one of the concentric propeller-carrying shafts. Yet again the power may be transmitted from the turbine through the compressor and gearing to one end of a shaft which is parallel to the engine crankshaft and from the other end of this shaft through gearing to one of the propeller-carrying shafts.

The accompanying drawings illustrate diagrammatically and by way of example alternative arrangements for carrying the invention into practice. In these drawings:

Figure 1 is a longitudinal part-sectional elevation of one arrangement in which the turbine drives directly the compressor and the shafting is carried right through the engine to gearing through which the drive is transmitted to one of the twin propellers.

Figure 2 is a similar view of another arrangement in which the turbine is separated from the compressor which it drives through gearing and the turbine drives the forward propeller. In this view the upper half is a section in a vertical plane that is on the line 2a—2a in Figure 3, while the lower half of the figure is a horizontal section that is on the line 2b—2b in Figure 4.

Figure 3 is a transverse section on the line 3—3 in Figure 2.

Figure 4 is a transverse section on the line 4—4 in Figure 2.

Figure 6 is a longitudinal part-sectional elevation showing another arrangement in which the turbine drives the compressor directly, but the drive is here transmitted to the propeller from the turbine by gearing and shafting carried otherwise than through the engine.

Figure 7 is a transverse section on the line 7—7 in Figure 6.

Figure 5:
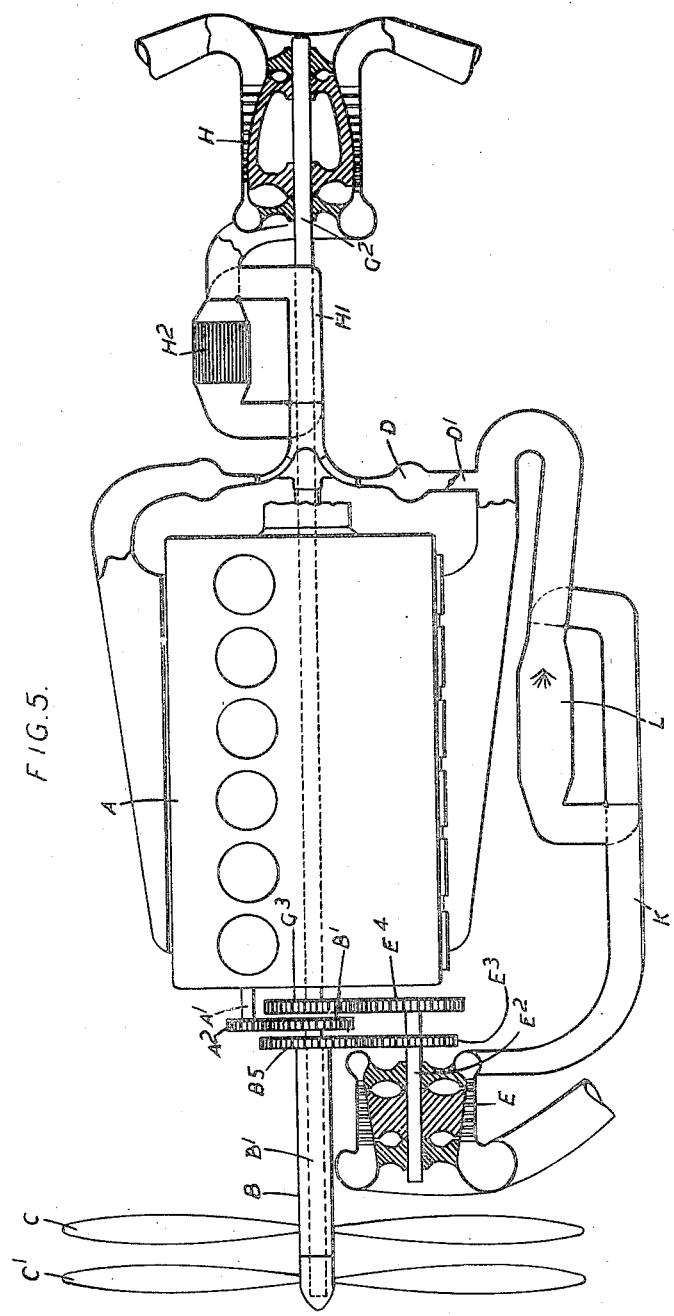
Figure 5 is a view similar to Figure 2 showing an alternative arrangement in which the turbine drives the after one of the twin propellers.

Referring to Figure 1 the engine A here shown is of a known type having more than one crankshaft and each of these is disposed otherwise than coaxial with the concentric shafts B and $B^1$ through which are driven the twin propellers C and $C^1$ which are of the same size and rotate oppositely. At the rear of the engine and driven by it is a centrifugal compressor D. The turbine E drives a shaft G on which is the axial flow compressor H which is conveniently placed between the turbine and the centrifugal compressor D. The shaft G is carried through the engine A running between and parallel to the crankshafts of the engine and coaxial with the concentric propeller shafts $BB^1$. A lay shaft J carries gear wheels $J^1$ and $J^2$ which respectively mesh with a gear wheel $G^1$ on the forward end of the shaft G and a gear wheel $B^2$ on the propeller shaft $B^1$ and through this gearing the turbine drives the foremost propeller $C^1$ while as shown the engine through suitable gearing drives in the opposite direction the aftermost propeller C. The propeller $C^1$ is preferably of the variable pitch type and the propeller C may also be of this type. The shaft G may run through a shaft driven through gearing from the engine crankshafts, this engine-driven shaft driving through gearing the propeller C.

The exhaust gases from the engine A are led through passages K directly to the turbine E. These gases may be combined with or supplemented by gases produced by the combustion of fuel in a chamber L to which may be supplied, as through the valve-controlled passage $D^1$, some of the air from the centrifugal compressor D. The gases from the engine may be carried through the combustion chamber L the gas flow through this chamber being controlled by valves. Alternatively the gases produced in the chamber L may be introduced in a suitable manner into the passage K through which the exhaust gases from the engine flow to the turbine E. There may be a combustion chamber L associated with each exhaust gas passage K. The air from the axial flow compressor H is delivered through a passage $H^1$ into the engine-driven centrifugal compressor D which then in effect acts as a stage of the compressor H. An intercooler $H^2$ may be provided through which the air from the compressor H may flow as it passes to the compressor D.

The axial flow compressor H may be of the single or multi-stage type. The turbine E also may have more than one stage and each stage may function in effect as a separate turbine to which the exhaust gases from the engine may be led separately and independently. Alternatively the gases may pass from one turbine stage to the next so that they act respectively as high and low, or high, intermediate and low pressure stages.

Turning to the arrangement shown in Figures 2, 3 and 4, the engine A has two crankshafts $A^1$ seen in the sections Figures 3 and 4, from which the drive to the rear propeller C is transmitted through a gear wheel $A^2$ on the end of each shaft and other gear wheels $A^3$ meshing with the gear wheel $B^2$ on the shaft B of the propeller C. In this case this gearing and that through which power is transmitted from the turbine E to the compressor H and to the foremost propeller $C^1$ is all grouped together at the front end of the engine A so that it may all be enclosed in a suitable casing and it is thus possible to effect some saving in weight. To enable this arrangement to be carried out the turbine is placed so that power is transmitted from it separately to the compressor H and to the propeller $C^1$. One way in which the mechanism may be disposed so as to attain this end is shown in Figure 2 by way of example. Here the turbine E is placed at the front of the engine A while the axial flow compressor H is situated behind the engine and beyond the centrifugal engine-driven compressor D. A shaft $G^2$ is then carried from the compressor H through the engine A and at its forward end is a gear wheel $G^3$ meshing with a wheel $E^1$ on the turbine shaft $E^2$. On this shaft is also a gear wheel $E^3$ which meshes with a wheel $B^3$ on the shaft $B^1$ on the end of which is the propeller $C^1$.

In the modification shown in Figure 5 of the arrangement just described the transmission gearing from the engine and from the turbine is as before all grouped together, but in this case it is altered so that the foremost propeller $C^1$ is driven by the engine and the after propeller is driven by the turbine. The shaft $B^1$ of the foremost propeller carries a gear wheel $B^4$ which meshes with gear wheels $A^2$ on the engine shafts $A^1$ of which only one is seen in the figure. As before the turbine shaft has thereon two gear wheels $E^1$ and $E^3$ of which $E^1$ meshes with a gear wheel $G^3$ on the end in front of the engine of the shaft $G^2$ running from the compressor H behind the engine, and the other wheel $E^3$ meshes with a wheel $B^5$ on the hollow shaft B of the propeller C through which runs the shaft $B^1$ of the propeller $C^1$.

In the further modification shown in Figures 6 and 7 the engine $A^3$ has a single crankshaft $A^4$ on which is a gear wheel $A^5$ meshing with a wheel M on a lay shaft $M^1$ on which is another wheel $M^2$ meshing with a wheel $B^5$ on the hollow shaft B of the aftermost propeller C. Here the compressor H is mounted near the turbine E on the shaft G behind the engine and this shaft has a gear wheel $G^4$ meshing with a wheel N on a shaft $N^1$ which runs forward at one side of the crankshaft $A^4$. On the forward end of the shaft $N^1$ is a gear wheel $N^2$ meshing with a wheel $B^4$ on the shaft $B^1$ of the foremost propeller $C^1$. With the exception of the gear wheels $G^4$ and N all the transmission gearing is again grouped together at the front of the engine so that it may be suitably enclosed.

It is to be noted that in the arrangements shown and described above with respect to Figures 1, 2 and 6 where the foremost propeller is driven by the turbine and the after propeller is driven by the engine an advantage is obtained when starting. When the engine rotates the after propeller C the air drawn by it through the foremost propeller $C^1$ causes this to rotate, the torque thus produced in the propeller shaft being transmitted back through the gearing and shafting to the turbine E. Further, the engine-driven centrifugal compressor D draws air through the axial flow compressor H and imparts torque to the rotor of that compressor. In this way the action of the exhaust gases from the engine on the turbine at starting is materially assisted both in transmitting torque to the turbine from the foremost propeller and by inducing rotation of the axial flow turbine.

What I claim as my invention and desire to secure by Letters Patent is:

1. A power plant comprising in combination an internal combustion engine operating on the two-stroke cycle and arranged to utilize air in the charge considerably in excess of that required for combustion, a propeller at one end of said engine and driven thereby, a centrifugal compressor at the other end of said engine and driven thereby which constantly supplies air to the engine, a turbine driven by the gases produced in the engine, an axial flow compressor at the same end of the engine as the centrifugal compressor, which is driven by the turbine and while the turbine is operative constantly delivers supercharging air for the engine to the engine-driven centrifugal compressor, and a propeller driven by the turbine mounted adjacent to and coaxially with the engine-driven propeller, said propellers being arranged to rotate in opposite directions.

2. A power plant consisting of the combination of parts claimed in claim 1, in which power is transmitted from the turbine through the axial flow compressor to the turbine-driven propeller.

3. A power plant comprising in combination an internal combustion engine operating on the two-stroke cycle and arranged to utilize air in the charge considerably in excess of that required for combustion, a first propeller at one end of said engine and driven thereby, a centrifugal compressor at the other end of said engine and driven thereby which constantly supplies air to the engine, a turbine driven by the gases produced in the engine, an axial flow compressor at the same end of the engine as the centrifugal compressor, gearing through which the turbine drives the axial flow compressor while the turbine is operative, means for delivering supercharging air from the axial flow compressor to the engine-driven centrifugal compressor, a second propeller mounted adjacent to and coaxially with the first propeller, and further gearing through which the turbine drives the second propeller in the opposite direction to that in which the first propeller is driven.

BENJAMIN WILLIAM BARLOW.

REFERENCES CITED

The following references are of record in the file of this patent:

UNITED STATES PATENTS

| Number | Name | Date |
| --- | --- | --- |
| 1,279,128 | Lake | Sept. 17, 1918 |
| 2,292,288 | Peteras-Pescara | Aug. 4, 1942 |
| 2,385,366 | Lysholm | Sept. 25, 1945 |
| 2,411,227 | Planiol et al. | Nov. 19, 1946 |
| 2,421,518 | Molloy | June 3, 1947 |
| 2,427,846 | Forsyth | Sept. 23, 1947 |
| 2,443,717 | Birmann | June 22, 1948 |
| 2,468,157 | Barlow et al. | Apr. 26, 1949 |

FOREIGN PATENTS

| Number | Country | Date |
| --- | --- | --- |
| 479,822 | Great Britain | Feb. 11, 1938 |
| 877,590 | France | Sept. 7, 1942 |